(12) United States Patent
Jackson et al.

(10) Patent No.: US 12,425,704 B2
(45) Date of Patent: Sep. 23, 2025

(54) CONTENT SYNCHRONIZATION USING MICRO-SEEKING

(71) Applicant: Comcast Cable Communications, LLC, Philadelphia, PA (US)

(72) Inventors: Matthew McDade Jackson, Denver, CO (US); Matthew Patrick Creehan, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/762,447

(22) Filed: Jul. 2, 2024

(65) Prior Publication Data

US 2024/0357216 A1    Oct. 24, 2024

Related U.S. Application Data

(63) Continuation of application No. 18/336,887, filed on Jun. 16, 2023, now Pat. No. 12,041,324, which is a (Continued)

(51) Int. Cl.
*H04N 21/8547* (2011.01)
*H04J 3/06* (2006.01)
*H04L 69/28* (2022.01)

(52) U.S. Cl.
CPC ....... *H04N 21/8547* (2013.01); *H04J 3/0635* (2013.01); *H04L 69/28* (2013.01)

(58) Field of Classification Search
CPC ........... H04N 21/8547; H04N 21/4302; H04N 21/8456; H04N 5/917; H04N 7/12; H04L 69/28; H04L 65/70; H04L 67/565; H04L 67/5651; H04L 69/04; H04J 3/0635; G10L 21/038; H03M 7/30
(Continued)

(56) References Cited

U.S. PATENT DOCUMENTS 11,330,349 B2    5/2022    Jackson et al.
11,722,754 B2    8/2023    Jackson et al.
(Continued)

OTHER PUBLICATIONS

US Patent Application filed Apr. 11, 2022, entitled "Content Synchronization Using Micro-Seeking", U.S. Appl. No. 17/718,074.
(Continued)

*Primary Examiner* — Thai Q Tran
*Assistant Examiner* — Nienru Yang
(74) *Attorney, Agent, or Firm* — BakerHostetler

(57) ABSTRACT

Methods and systems are disclosed maintaining playback of content at a target or desired playback time. A playback device may be configured to compare a current playback time of a content asset to a target playback time of the content asset and to determine, for each comparison, whether a difference between the current playback time and the target playback time has reached a threshold. Based on determining that the difference between the current playback time and the target playback time has reached a threshold, the playback device may seek to the target playback time of the content asset. The playback device may be configured to repeatedly perform the comparing, determining and seeking operations in order to maintain the current playback time of the content within the threshold of the target playback time.

20 Claims, 7 Drawing Sheets

Related U.S. Application Data continuation of application No. 17/718,074, filed on Apr. 11, 2022, now Pat. No. 11,722,754, which is a continuation of application No. 16/162,805, filed on Oct. 17, 2018, now Pat. No. 11,330,349.

(58) Field of Classification Search
USPC .......................................................... 375/240
See application file for complete search history.

(56) References Cited

U.S. PATENT DOCUMENTS

| | | |
|---|---|---|
| 2006/0002681 A1 | 1/2006 | Spilo et al. |
| 2009/0249222 A1* | 10/2009 | Schmidt ............. H04N 21/4143 713/400 |
| 2014/0270680 A1* | 9/2014 | Bloch ..................... G11B 27/11 386/201 |
| 2017/0353747 A1 | 12/2017 | Thomas et al. |
| 2020/0128306 A1 | 4/2020 | Jackson et al. |

OTHER PUBLICATIONS

US Patent Application filed Jun. 16, 2023, entitled "Content Synchronization Using Micro-Seeking", U.S. Appl. No. 18/336,887.

\* cited by examiner

CONTENT SYNCHRONIZATION USING MICRO-SEEKING

CROSS-REFERENCE TO RELATED APPLICATION

This application is a continuation of U.S. patent application Ser. No. 18/336,887, filed Jun. 16, 2023, which is a continuation of U.S. patent application Ser. No. 17/718,074, filed Apr. 11, 2022, now U.S. Pat. No. 11,722,754, which is a continuation of U.S. patent application Ser. No. 16/162,805, filed Oct. 17, 2018, now U.S. Pat. No. 11,330,349, each of which is hereby incorporated by reference in its entirety.

BACKGROUND

Content playback such as audio or video playback may fall behind a target playback time for any number of reasons. Transmission of the content over a network may require more bandwidth than is currently available to a device configured to cause playback of the content. While a portion of the content may be stored in a buffer of the device, it is possible that an initial loading of the buffer and/or an emptying of the buffer due to network delays may result in an undesirable interruption of content playback. In live events where playback of the content is delayed by several seconds, a viewer may be made aware of an outcome of the event through other means such as cell phone usage before the outcome is displayed at the playback device. In a location with multiple playback devices, a first one of the playback devices may be out of sync with a second one of the playback devices, leading to inconsistent viewership. Thus, solutions for maintaining playback of the content at a target playback time may be desirable.

SUMMARY

Methods and systems are disclosed for repeatedly seeking, in small increments, to a target playback time of content during content playback. A playback device may receive from a content provider a content asset and a manifest associated with the content asset. During playback of the content asset, it is possible that a current playback time of the content asset may lag behind a target or "live" playback time of the content asset, resulting in an undesirable viewing experience. In order to prevent this lag in playback, the playback device may be configured to compare a current playback time of the content to a target playback time of the content and to determine, for each comparison, whether a difference between the current playback time and the target playback time has reached a threshold. Based on determining that the difference between the current playback time and the target playback time has reached a threshold, the playback device may seek to the target playback time of the content. The playback device may be configured to repeatedly perform the comparing, determining and seeking operations in order to maintain the current playback time of the content within a threshold amount of the target playback time.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Methods and systems are disclosed maintaining playback of content at a target or desired playback time. A playback device such as a set-top box may be configured to receive one or more content fragments associated with a content asset, such as a movie, television show, or sporting event. The playback device may receive a manifest that identifies the one or more content fragments of the content asset. The playback device, upon receipt of the content fragments, may store the content fragments and may cause playback of one or more of the content fragments.

During playback of the content fragments, it is possible that a current playback time of the content may fall behind a target playback time of the content. The target playback time may correspond to a desired or "live" playback time of the content, such as real-time playback or substantially real-time playback of the content asset. This lagging or falling behind of the target playback time may occur for any number of reasons, including but not limited to insufficient bandwidth available to the playback device. The playback device may compare the current playback time of the content to the target playback time of the content in order to determine whether a difference between the current playback time and the target playback time has reached a threshold. Based on determining that the difference between the current playback time and the target playback time has reached a threshold, the playback device may seek to the target playback time of the content. The playback device may be configured to repeatedly perform the comparing, determining and seeking operations in order to maintain the current playback time of the content within the threshold of the target playback time. The threshold may be small (e.g., in the order of milliseconds) such that the seek operation goes unnoticed by one or more viewers of the content asset.

Figure 1:
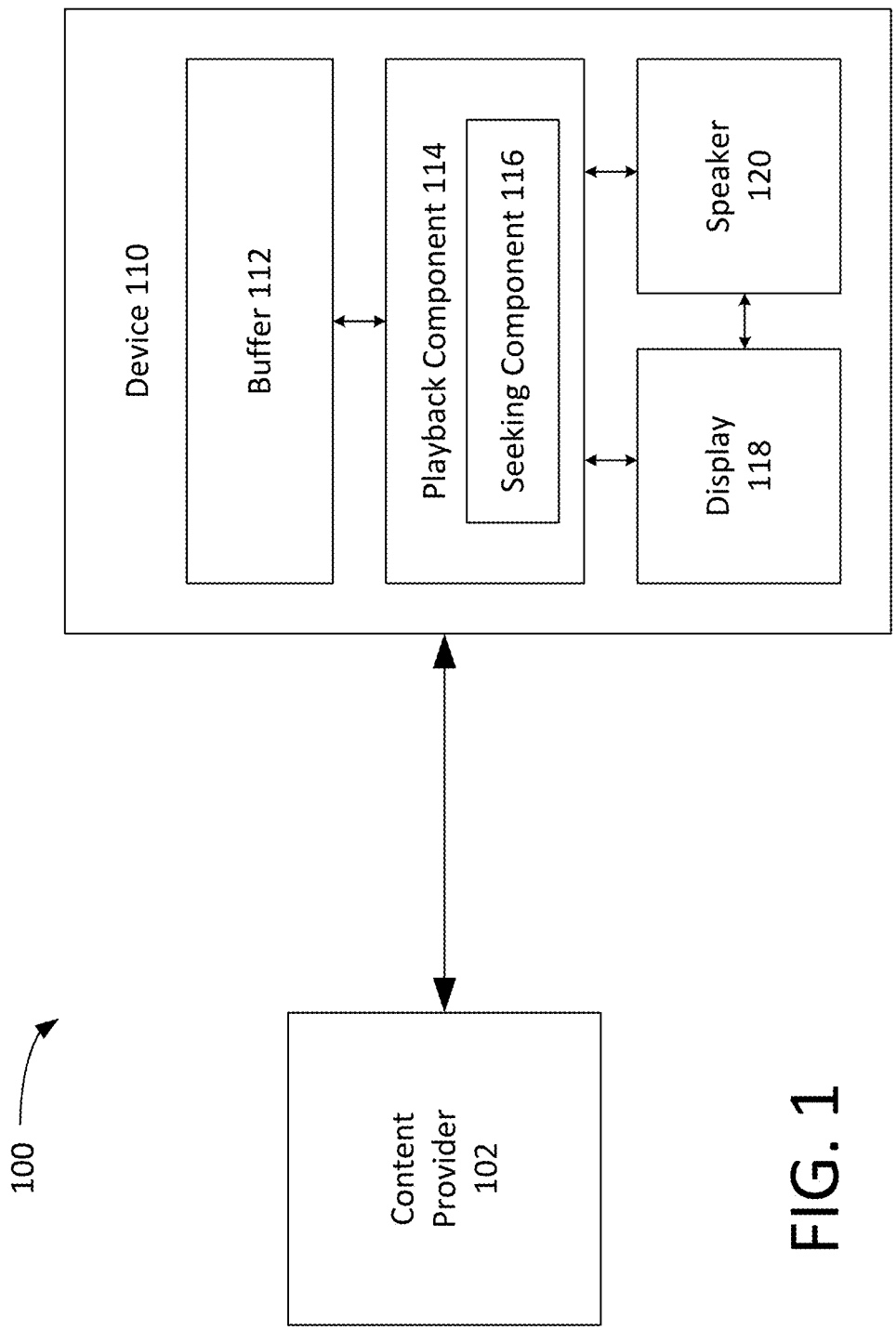
FIG. 1 shows a block diagram of an example system.

FIG. 1 shows an example system diagram in accordance with an aspect of the disclosure. The system 100 may comprise a content provider 102 and a device 110. The content provider 102 may be configured to send to the device 110 one or more content fragments for playback by the device 110. Each of the content fragments may correspond to a portion of a content asset, such as a two-second portion of the content asset. The content asset may comprise any type of media capable of being presented by the playback device to a user, such as audio and/or video content associated with a television show, a movie, or a sporting event.

The device 110 may be a playback device, such as a set-top box, desktop computer, tablet, cellular telephone, or any device capable of streaming or otherwise presenting content to a user. The device 110 may be configured to receive one or more content fragments from the content provider 102 for playback by the device 110. The device 110 may comprise one or more of a buffer 112, a playback component 114, a seeking component 116, a display 118 and a speaker 120.

The buffer 112 may be configured to receive the one or more content fragments from the content provider 102. The buffer 112 may be configured to store a number of the content fragments to be presented to one or more users of the device 110. The buffer 112 may temporarily store one or more of the content fragments until the content fragments are ready for playback by the device 110. The buffer 112 may be configured to store any number of content fragments, such as two content fragments or ten content fragments. The device 110 may comprise one or a plurality of buffers 112 as necessary to store content fragments for presentation to a user. The buffer 112 may be configured to send to the playback component 114 the one or more content fragments for playback.

The buffer 112 may send the content fragments to the playback component 114 in the order that they were received from the content provider 102. Additionally or alternatively, the buffer 112 may be configured to analyze a timestamp of the content fragment and to send the content fragments to the playback component 114 in an order determined based on the timestamp. The timestamp may be stored in a manifest received from the content provider 102. The manifest may identify each of the content fragments associated with the content asset and may associate, with each of the content fragments, a timestamp of the corresponding content fragment. The timestamp may represent a time at which the content fragment was packaged, a time at which the content fragment was sent by the content provider 102 to the device 110, and/or a time at which the content fragment should be presented to a user of the device 110.

The playback component 114 may be configured to receive one or more content fragments from the buffer 112. The playback component 114 may be configured to cause playback of the one or more content fragments. The playback component 114 may be in communication with one or more of the display 118 and the speaker 120 associated with the device 110 for presenting the content asset to one or more users of the device 110. The playback component 114 may present the content fragments in the order at which they were received from the buffer 112. Additionally or alternatively, the playback component 114 may be configured to access a timestamp associated with each content fragment and to present the content fragments in an order determined by the timestamps.

The playback component 114 may comprise a seeking component 116. The seeking component 116 may be configured to seek to one or more locations of the content asset. The seeking component 116 may be a "micro-seeking" component configured to seek in small increments (e.g., milliseconds) that may be undetectable by a viewer of the content asset. The seeking component 116 may be configured to compare a current playback time of the content asset to a target playback time of the content asset and to determine, for each comparison, whether a difference between the current playback time and the target playback time has reached a threshold. Based on determining that the difference between the current playback time and the target playback time has reached the threshold, the seeking component 116 may seek to the target playback time of the content. The seeking component 116 may monitor the current playback time of the content and the target playback time of the content using one or more of a timestamp associated with the content and a clock associated with the device 110. The clock associated with the device 110 may be based on a network time protocol. However, it is understood that determining the current playback time of the content is not limited to the example of a clock based on a network time protocol.

The seeking component 116 may determine that the target playback time of the content asset is t (e.g., 1:15 PM). The target playback time of the content asset may be determined based on one or more of a clock associated with the device 110 and a timestamp associated with one or more of the received content fragments. The seeking component 116 may determine that the current playback time of the content is t−30 ms. Thus, seeking component 116 may determine that the current playback time of the content is lagging behind the target playback time of the content by thirty milliseconds. Based on this determination, the seeking component 116 may determine a location in the content that corresponds to the target playback time t and may seek to that location of the content asset in the buffer. Seeking to the location in the buffer may comprise adjusting a playback time of the content asset. A seek operation performed by the device 110 may set the playback location of the content to a specific time within the content asset. The seek operation may be small (e.g., milliseconds) such that it is undetectable by one or more viewers of the content asset.

The display 118 may be configured to display video content to a user of the device 110. The display 118 may receive from the playback component 114 video content associated with one or more content fragments and may present the video content to one or more users of the device 110. The display 118 may be part of the device 110, such as in the example that the device 110 is a desktop computer, laptop, tablet, or cellular telephone. Additionally or alternatively, the display 118 may be external to the device 110, such as in the example that the device 110 is a set-top box. The external display 118 may be a monitor or any device capable of receiving an electrical signal from the playback component 114 and displaying the content to one or more users of the device 110.

The speaker 120 may be configured to present audio content to a user of the device 110. The speaker 120 may receive from the playback component 114 audio content associated with one or more content fragments may present the audio content to one or more users of the device 110. The speaker 120 may be part of the device 110, such as in the example that the device 110 is a desktop computer, laptop, tablet, or cellular telephone. Additionally or alternatively, the speaker 120 may be external to the device 110, such as in the example that the device 110 is a set-top box. The external speaker 120 may be a surround sound speaker system, a speaker associated with an external display, or any device capable of receiving an electrical signal from the playback component 114 and presenting the audio associated with the content to one or more users of the device 110.

The term "content asset" as used herein may comprise any type of audio, video, or other media capable of being presented to a user. The content asset may be formatted for streaming over an Internet Protocol (IP) video network. The content asset be formatted in any one of a variety of formats, such as, for example, H.262, H.264, H.265, MPEG-4 Part 2, or MPEG-2, and may be transmitted using one or more standards such as SCTE-35 or other specifications. Although reference may be made to example standards (e.g., MPEG) and formats, one of skill in the art will recognize that the systems and methods described herein are applicable to any format or standard that support audio and/or video. The combined MPEG-1, MPEG-2, and MPEG-4 or other MPEG standards are hereinafter referred to as MPEG.

The output of a single MPEG audio and/or video codec may be referred to herein as a transport stream. In an MPEG encoded transmission, content and other data are transmitted in packets, which collectively make up the transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, for example, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts may ensure that every packet that is needed to decode a stream is received. A synchronization system may be used so that decoders may correctly identify the beginning of each packet and deserialize the bit stream into words.

A content asset, such as a program, may be a group of one or more PIDs that are related to each other. For instance, a multi program transport stream used in digital television might contain three programs, to represent three television channels. In some examples, each channel may comprise one video stream, one or two audio streams, and any necessary metadata. A receiver wishing to tune to a particular "channel" merely has to decode the payload of the PIDs associated with its program, and may discard the contents of all other PIDs.

Figure 2:
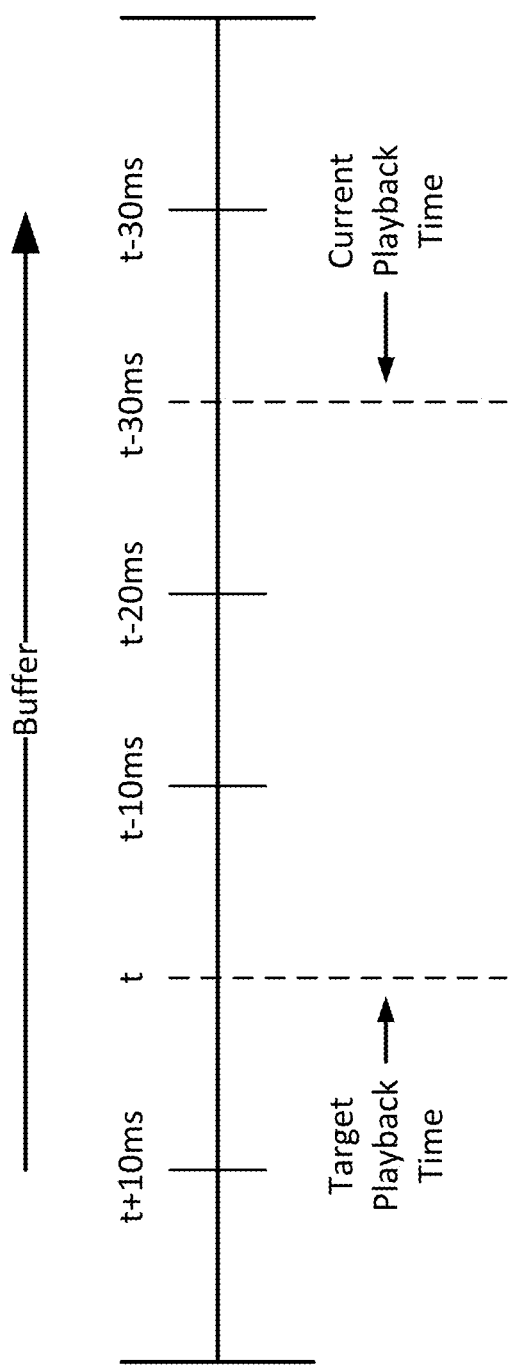
FIG. 2 shows an example of a buffer.

FIG. 2 shows an example operation of a buffer, such as the buffer 112 shown in FIG. 1. The buffer may be configured to receive from a content provider one or more content fragments associated with a content asset. The buffer may be configured to temporarily store the one or more content fragments for playback by a device, such as the device 110. The buffer may be configured to store a given number of content fragments, such as ten content fragments. Additionally or alternatively, the buffer may store the content fragments for a given time duration before the content fragments are discarded. As new content fragments are received by the buffer from the content provider, old content fragments may be deleted. In an example where each content fragment is two seconds in length and the buffer is configured to store a maximum of ten content fragments, the buffer may be configured to store the most recent twenty seconds of content received by the content provider. Each time a new content fragment is received by the buffer, the oldest content fragment stored in the buffer may be deleted. Additionally or alternatively, the buffer may send the oldest content fragment to another area of storage, such as a secondary buffer of the device.

As shown in FIG. 2, the target playback time of a content asset may be represented by the time t. The target playback time may be based on a clock associated with the playback device. The clock may be based on a network time protocol. The current playback time of the content asset may be at time t−30 ms. In other words, the current playback time of the content asset is thirty milliseconds behind the target playback time of the content asset. The current playback time of the content asset may be determined based on a timestamp associated with the content asset. The timestamp may be stored in a manifest at the device or at the content provider. This lag in playback between the current playback time and the target playback time may be a result of insufficient bandwidth at the device to receive the content from the content provider. The device may be configured to store a portion of content in the buffer in order to prevent disruptions in playback. However, it is possible that an initial loading of the buffer and/or an emptying of the buffer due to network delays may result in an undesirable interruption of content playback, thereby causing playback of the content from the buffer to fall behind the target playback time.

Figure 3:
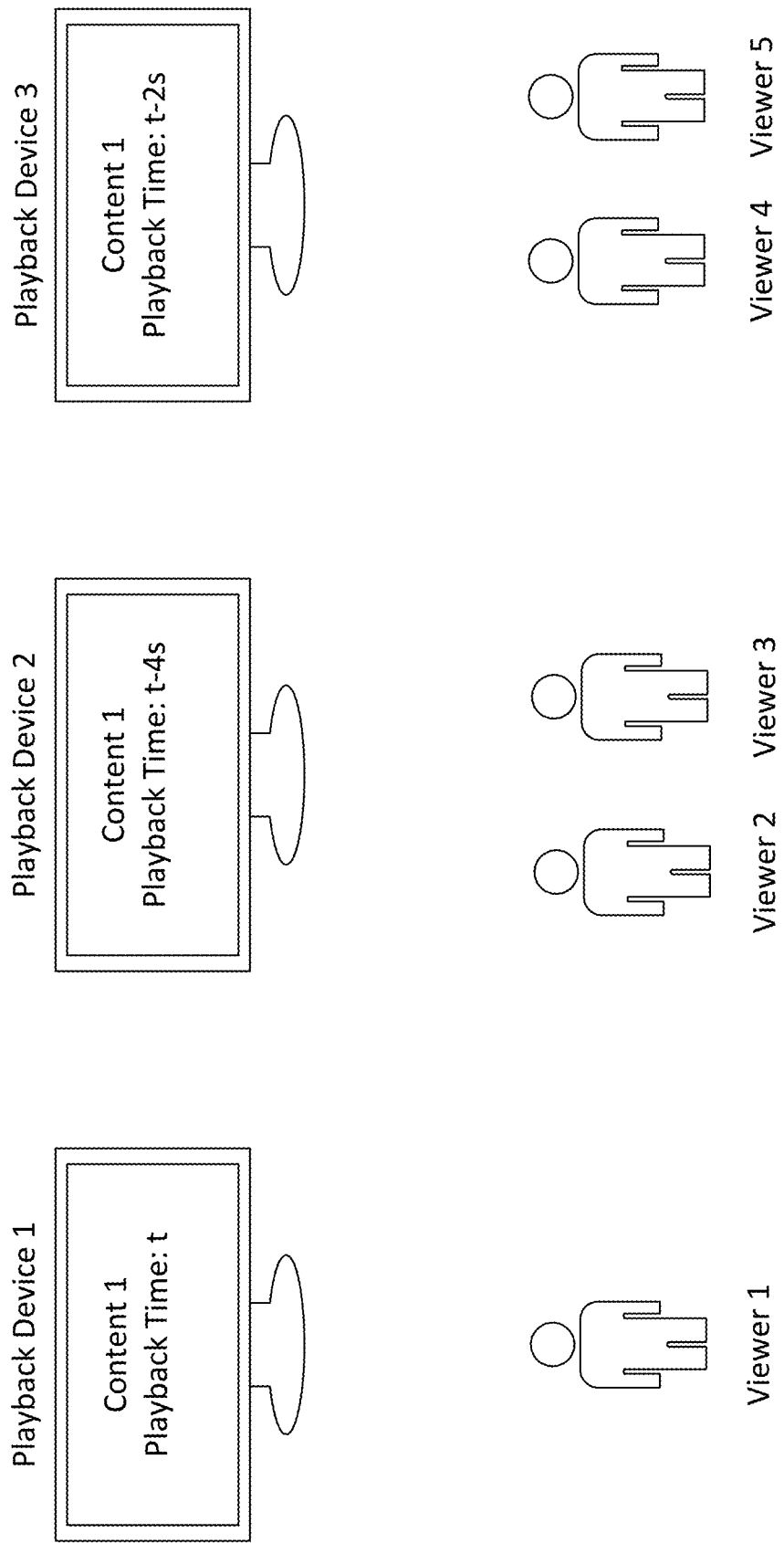
FIG. 3 shows an example of asynchronous playback of content by multiple playback devices.

FIG. 3 shows an example scenario involving a plurality of playback devices presenting the same content in a location that comprises a large number of patrons. Content 1 may be a sporting event, such as a football game, being shown on multiple televisions at a particular location. While the figure shows three playback devices with five patrons viewing the content, it is understood that any number of playback devices may be being viewed by any number of patrons. As shown in the figure, Playback Device 1 may be presenting the content at the target playback time (e.g., in real time or substantially real time). However, Playback Device 2 may be experiencing a lag in playback of four seconds due to a lack of bandwidth or processing issues at the device. Similarly, Playback Device 3 may be experiencing a lag in playback of two seconds due to a lack of bandwidth or processing issues at the device. Thus, it is possible that Viewer 1 is viewing the content four seconds earlier than Viewer 2 and Viewer 3, and two seconds earlier than Viewer 4 and Viewer 5. Viewer 1 may celebrate upon the scoring of a touchdown prior to the display of the touchdown at Playback Device 2, causing the viewing experience for Viewer 2 and Viewer 3 to be ruined or highly disrupted.

While FIG. 3 shows an example where the current playback time is lagging behind the target playback time by as much as four seconds, it is understood that even minor differences (e.g., milliseconds) between the current playback time and the target playback time may significantly disrupt a viewer's experience. In an example where audio is being presented with the content, the lag in audio between Playback Device 1, Playback Device 2 and Playback Device 3 may be easily recognized by a user. It is further understood that differences between a target playback time and a current playback time may be undesirable even in situations with a single playback device. For example, a user watching the football game at his home television may learn of an event in the game through a text message or over the Internet prior to the event being displayed on the user's playback device. As discussed above, it is possible for current playback time to fall behind the target playback time by many seconds or even minutes, resulting in an undesirable viewing experience for the user.

Current methods for adjusting a playback duration of a content asset do not improve the viewing experience for the user. One common solution for adjusting a playback location of a content asset involves dropping frames of the content asset to speed up playback of the content asset in order to reach the live point. However, this may involve editing the actual video file which is time consuming and leaves room for error. In addition, many playback devices key the playback of content off of the audio file instead of the video file. Dropping frames may edit the video, but if the player is keyed off the audio than the audio may become desynchronized from the video. Thus, improved methods for adjusting video playback are desirable.

Figure 4:
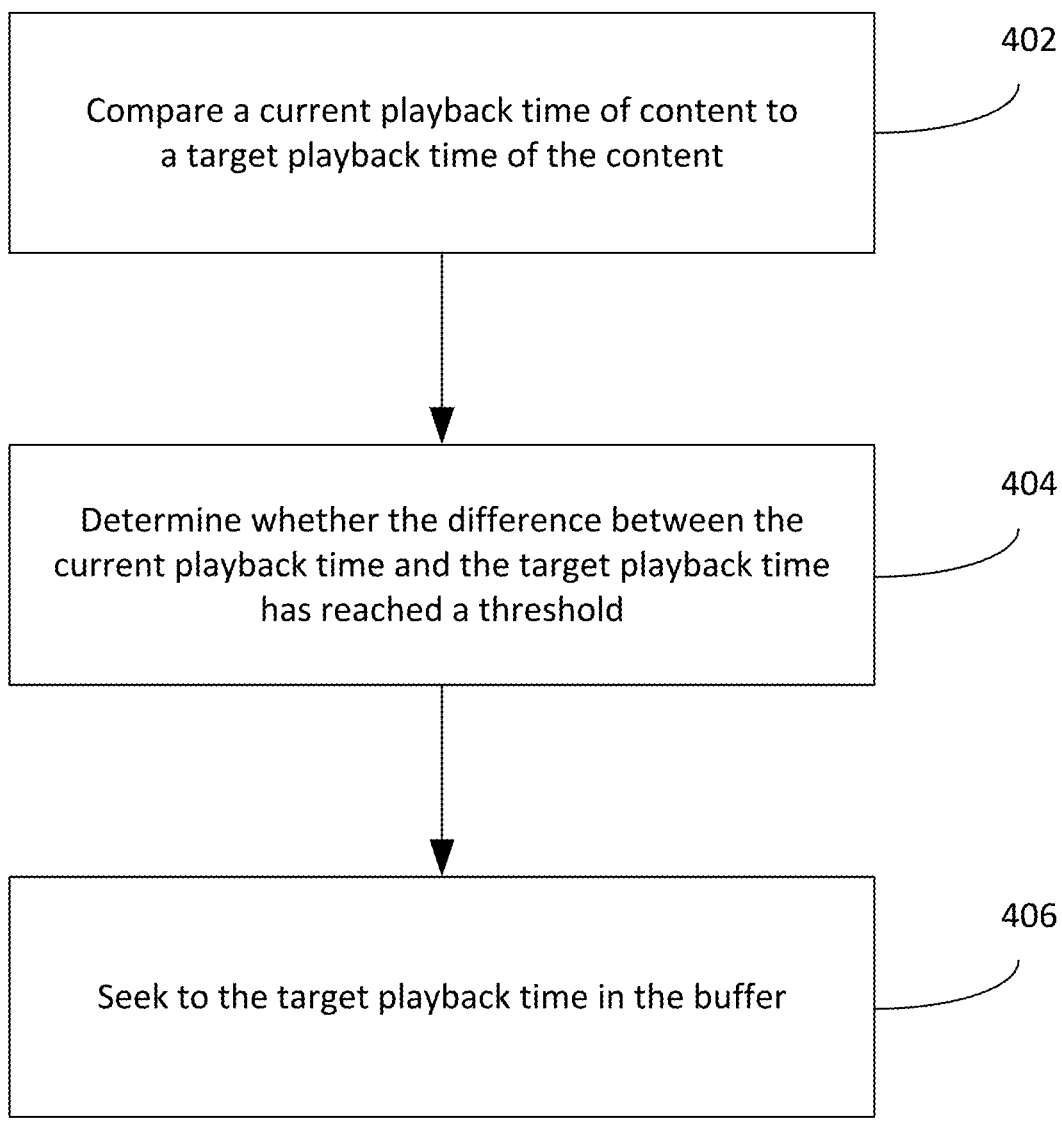
FIG. 4 shows a flow chart of an example method.

FIG. 4 shows an example method 400 for adjusting media playback. At step 402, a current playback time of content may be compared to a target playback time of the content. The current playback time of the content may be compared to the target playback time of the content repeatedly, for example periodically or at periodic intervals. The comparison may be performed each time the device is configured to check for new commands (e.g., play, pause, fast-forward, or rewind), which may be approximately every millisecond. However, it is understood that the comparison may be performed constantly or at any interval, such as the fastest interval that is supported by the device. The comparison may be performed by a device such as the device 110 shown in FIG. 1.

Comparing the current playback time and the target playback time repeatedly may comprise comparing the current playback time and the target playback time at certain time intervals (such as, every 100 milliseconds). The current playback time of the content may be determined based on a timestamp associated with the content. The timestamp may be stored in a manifest associated with the content. The target playback time of the content may be determined based on at least one of a clock associated with the playback device and a timestamp associated with the content. The clock associated with the playback device may be based on a network time protocol.

The device may determine, based on the network time protocol, that a "live" or "real" time of the content is currently at a time t (e.g., 1:00 PM). Thus, the target playback time of the content is time t. The device may additionally or alternatively determine that the current playback time of the content is at t−30 ms. In other words, the current playback time of the content is thirty milliseconds behind the target playback time of the content. This current playback time of the content may be determined based on a timestamp stored in a manifest associated with the content. The playback device may determine an identifier associated with the content, or an identifier associated with a particular fragment of the content, and may perform a lookup of this identifier in the manifest in order to determine the current playback time of the content.

At step 404, it may be determined whether a difference between the current playback time and the target playback time has reached a threshold. The threshold may be a given time duration that is determined or stored by the playback device. The threshold may represent a maximum acceptable difference between the current playback time and the target playback time. An example threshold may be five milliseconds. Thus, if the device determines that the current playback time has deviated from the target playback time by at least five milliseconds, it may be determined that a difference between the current playback time and the target playback time has reached the threshold. If the difference between the current playback time and the target playback time is less than five milliseconds, it may be determined that the threshold has not been reached.

At step 406, the device may seek to the target playback time of the content. The device may seek to the target playback time of the content based on a determination by the device that the difference between the current playback time and the target playback time has reached the threshold. The device may determine that the difference between the current playback time and the target playback time is currently thirty milliseconds, which is greater than the threshold of five milliseconds, and thus may search to the target playback time of the content. Searching to the target playback time of the content may comprise searching to the exact target playback time of the content, such as time t. Searching to the target playback time of the content may comprise searching to a point within the threshold of the target playback time of the content, such as t−2 ms.

The threshold may be determined such that a seek operation between the current playback time and the target playback time during playback of the content does not cause any noticeable disruption to the playback of the content. A five second threshold may be too large, causing the device to continuously seek ahead five seconds in the content which may cause an undesirable disruption in the content playback. In contrast, a five millisecond threshold may only cause the device to seek ahead in the content by five milliseconds, which may go unnoticed by a user of the playback device.

The device may be configured to repeat one or more of steps 402, 404 and 406 in order to remain within the threshold of the target playback time. The device may be configured to repeatedly compare the current playback time of the content with the target playback time of the content. This may comprise comparing the current playback time of the content with the target playback time of the content at repeated intervals. Each time the device determines that the difference between the current playback time and the target playback time has reached the threshold, the device may seek to the target playback time of the content or to a location within the threshold of the target playback time of the content.

Figure 5:
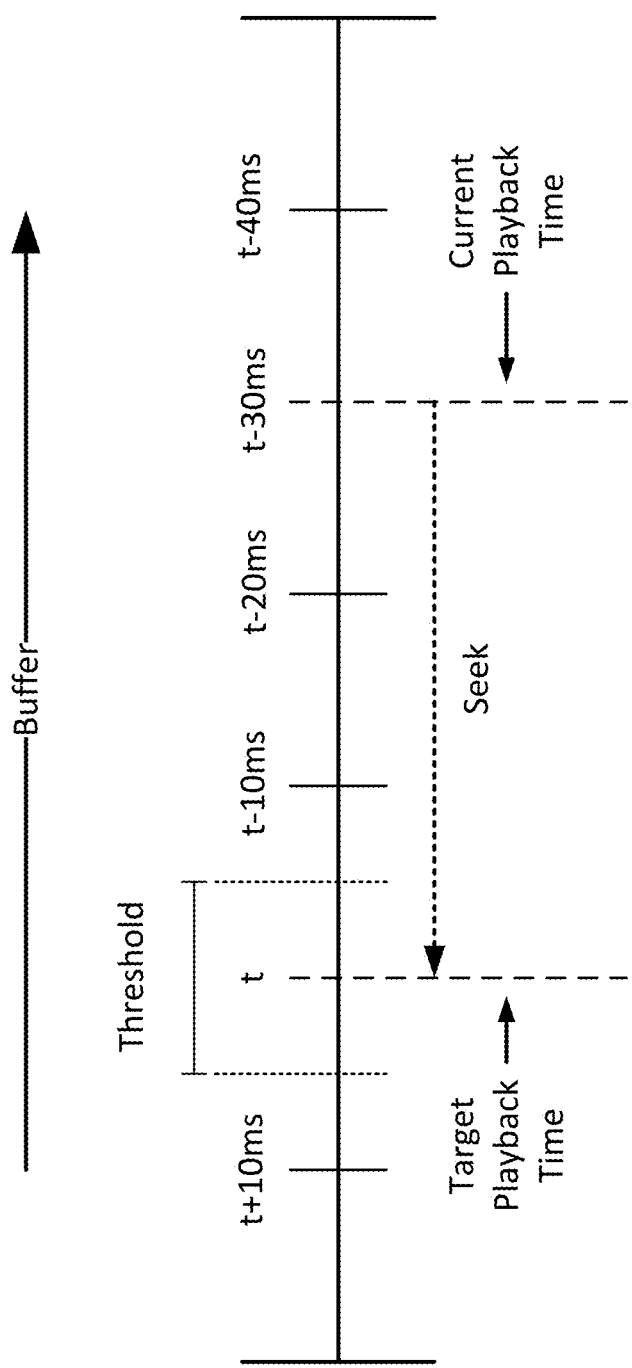
FIG. 5 shows an example of a seek operation in a buffer.

FIG. 5 shows an example of a seek operation within a buffer. The buffer may be similar to the buffer 112 of device 110 shown in FIG. 1. The buffer may be configured to receive content from a service provider. The content may be received in fragments such as two-second or ten-second fragments. The device 110 may determine at a certain time during playback of the content that a current playback time of the content has reached or exceeded a threshold of the target playback time of the content. As shown in the figure, the target playback time may be represented by time 1. The target playback time may be determined based on a network time protocol. The current playback time may be at time t−30 ms. The current playback time may be based on a timestamp of the content. The threshold deviation from the target playback time may be represented by t+5 ms and t−5 ms. Based on a determination that the current playback time exceeds the target playback time by at least five milliseconds, the device may seek to the target playback time of the content.

While the example above uses a threshold of five milliseconds, it is understood that the threshold may be of any duration. The threshold may be determined such that a seek operation within the threshold of the target playback time does not cause a noticeable disruption in the content playback. An example threshold may be any time period that is less than 100 milliseconds (e.g., 50 milliseconds), or a time period that is less than the average human ear would be capable of detecting a noticeable echo. However, the threshold is not limited by this example. The threshold may be configurable by a user of the device. There may be different thresholds based on the type of content that is being viewed. Live content such as sporting events may have a very small threshold such that a viewer of the content remains as close to the live point as possible. In contrast, streaming on-demand content that has previously aired may be associated with a larger threshold.

It is understood that at certain times (e.g., upon beginning playback of the content), the difference between the current playback time and the target playback time may be much larger than the threshold. This may happen as a result of there not being any content in the buffer to present while the device is waiting for remaining content fragments from the content provider. Thus, it may be necessary for the device to seek a larger amount in the content (e.g., one or more seconds) back to the target playback time of the content. While this seek operation may be apparent to a viewer, it may be necessary it order to get back to the live playback time of the content. However, once playback is within the threshold of the target playback time, the device may repeatedly compare, determine, and seek to the target playback time immediately or substantially immediately upon the threshold being exceeded.

Figure 6:
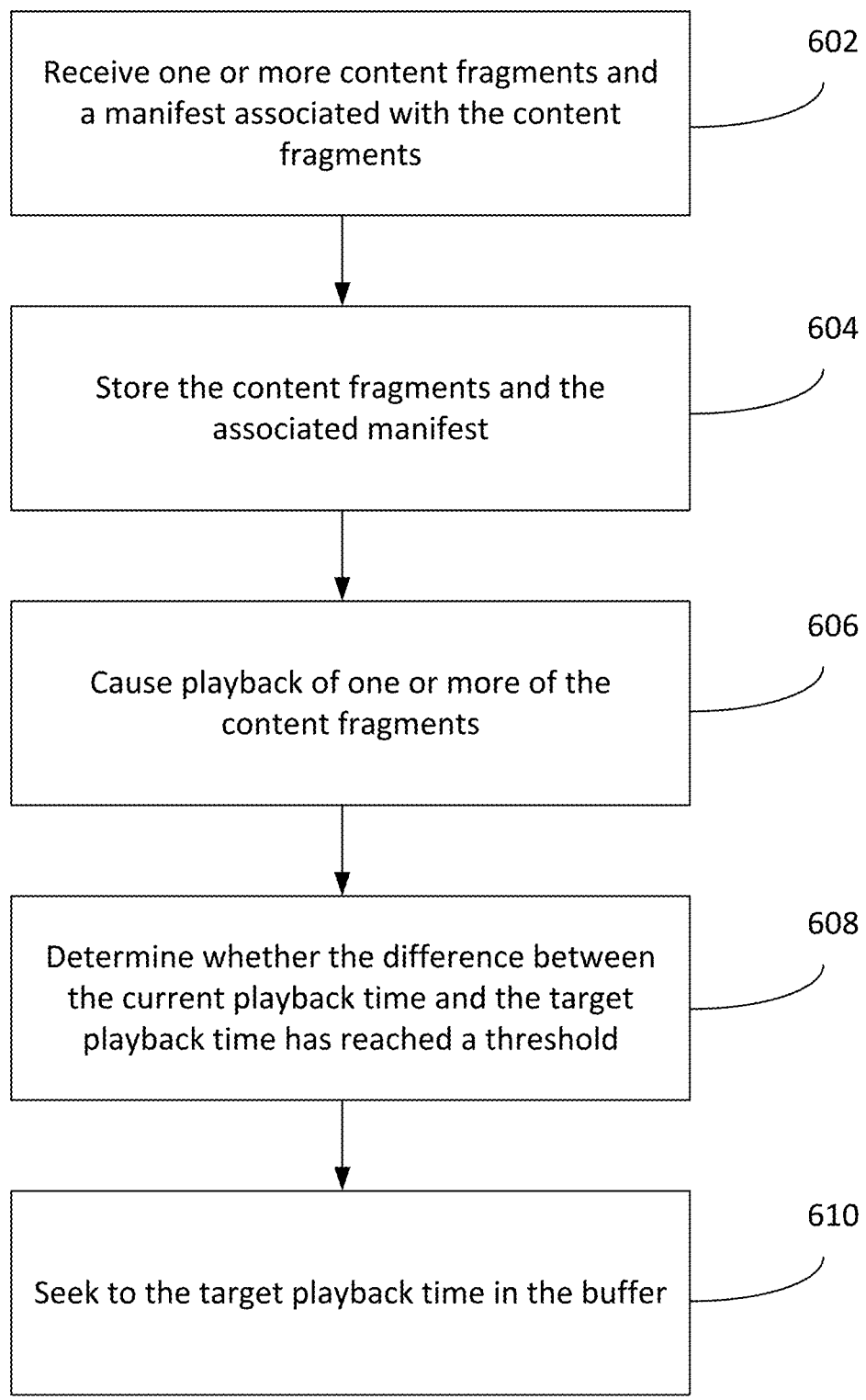
FIG. 6 shows a flow chart of an example method.

FIG. 6 shows an example method in accordance with an aspect of the disclosure. At step 602, one or more content fragments of a content asset may be received. A manifest associated with the one or more content fragments may be received. At least one of the one or more content fragments and the manifest may be received at a device, such as the device 110 shown in FIG. 1. A content asset may comprise a movie, a television show, a sporting event, or any media that is capable of being presented to a user. Each of the content fragments may correspond to a portion of a content asset, such as a two-second portion of the content asset. However, it is understood that the content fragment may have any length that is desirable for transmission over a network.

At step 604, one or more of the content fragments may be stored in a buffer, such as the buffer 112 shown in FIG. 1. The manifest may additionally or alternatively be stored in the buffer. The buffer may be configured to receive one or more content fragments from the content provider 102. The buffer may be configured to store a determined number of content fragments to be presented to one or more users of the playback device. The buffer may be configured to store any number of content fragments, such as two content fragments or ten content fragments. The buffer may be configured to send the content fragments to a playback component of the device in the order they were received from the content provider. Additionally or alternatively, the buffer may be configured to analyze a timestamp of the content fragment and to send to the fragments to the playback component in an order based on the timestamp.

At step 606, playback of one or more of the content fragments may be caused. The playback component may be configured to cause playback of the content fragments based on at least one of an order in which they were received from the buffer and/or a timestamp associated with each of the content fragments. The device may comprise at least one of a display and a speaker in order to present the content to a user of the device. The display and/or the speaker may be part of the device, such as in the example that the device is a desktop computer, laptop, tablet, or cellular telephone. Additionally or alternatively, the display and/or the speaker may be external to the device, such as in the example that the device is a set-top box.

During playback of the content asset, it is possible that the current playback time of the content may fall behind a target playback time of the content. The device may determine, based on a network time protocol, that a "live" or "real" time is currently at a time t (e.g., 1:00 PM). Thus, the target playback time of the content is time t. The device may additionally or alternatively determine that the current playback time of the content is at t−30 ms. In other words, the current playback time of the content is thirty milliseconds behind the target playback time of the content. This current playback time of the content may be determined based on a timestamp stored in a manifest associated with the content. The playback device may be determine an identifier associated with the content, or an identifier associated with a particular fragment of the content, and may perform a lookup of this identifier in the manifest in order to determine the current playback time of the content.

At step 608, it may be determined whether a difference between the current playback time and the target playback time has reached a threshold. The threshold may be a given time duration that is determined or stored by the playback device. The threshold may represent a maximum acceptable difference between the current playback time and the target playback time. An example threshold may be five milliseconds. Thus, if the device determines that the current playback time has deviated from the target playback time by at least five milliseconds, it may be determined that a difference between the current playback time and the target playback time has reached the threshold. If the difference between the current playback time and the target playback time is less than five milliseconds, it may be determined that the threshold has not been reached.

At step 610, the device may seek to the target playback time of the content. The device may seek to the target playback time of the content based on a determination by the device that the difference between the current playback time and the target playback time has reached the threshold. The device may determine that the difference between the current playback time and the target playback time is currently thirty milliseconds, which is greater than the threshold of five milliseconds, and thus may search to the target playback time of the content. Searching to the target playback time of the content may comprise searching to the exact target playback time of the content, such as time t. Searching to the target playback time of the content may comprise searching to a point within the threshold of the target playback time of the content, such as t−2 ms.

The threshold may be determined such that a seek operation between the current playback time and the target playback time during playback of the content does not cause any noticeable disruption to the playback of the content. A five second threshold may be too large, causing the device to repeatedly seek ahead five seconds in the content which may cause an undesirable disruption in the content playback. In contrast, a five millisecond threshold may only cause the device to seek ahead in the content by five milliseconds, which may go unnoticed by a user of the playback device.

The device may be configured to repeat one or more of steps 608 and 610 in order to remain within the threshold of the target playback time. The device may be configured to repeatedly compare the current playback time of the content with the target playback time of the content. This may comprise comparing the current playback time of the content with the target playback time of the content at repeated intervals. Each time the device determines that the difference between the current playback time and the target playback time has reached the threshold, the device may seek to the target playback time of the content or to a location within the threshold of the target playback time of the content.

Figure 7:
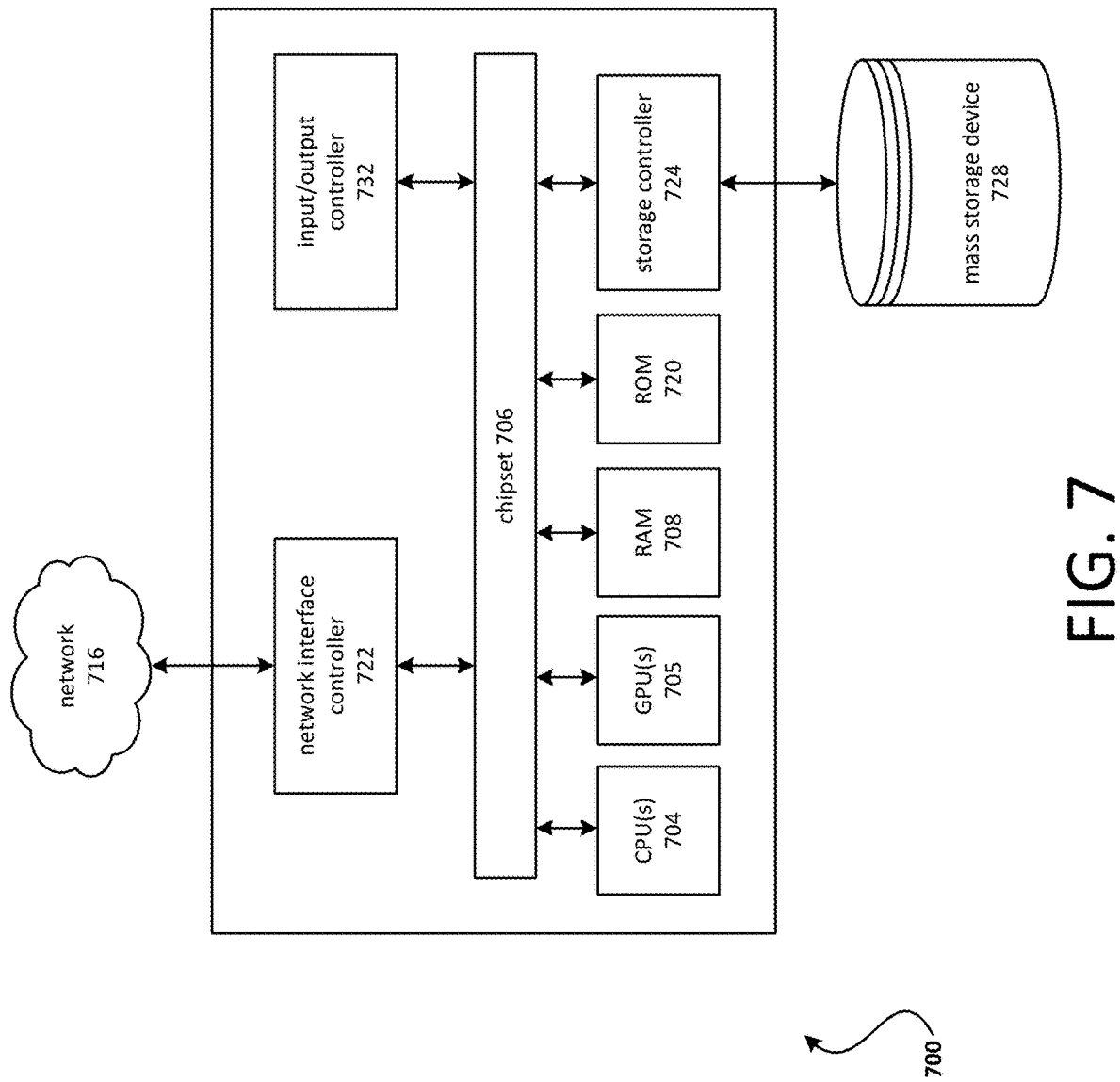
FIG. 7 shows a block diagram of an example computing device.

FIG. 7 depicts a computing device that may be used in various aspects, such as the servers, modules, and/or devices depicted in FIG. 1. With regard to the example architecture of FIG. 1, the content provider 102 and/or the device 110 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 4-6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 4-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving one or more content fragments associated with a type of content;
   determining, based on the type of content, a threshold indicating a difference between a current playback time and a target playback time;
   receiving a manifest indicating one or more timestamps associated with the one or more content fragments, wherein each timestamp of the one or more timestamps indicates a target playback time of a corresponding content fragment of the one or more content fragments;
   based on a determination that a difference, indicated by a timestamp of the one or more timestamps, between a current playback time of a first content fragment, of the one or more content fragments, and a target playback time of the first content fragment has satisfied the threshold:
   causing an adjustment to playback to advance to a second content fragment, of the one or more content fragments, corresponding to a target playback time of the second content fragment.

2. The method of claim 1, wherein the threshold is larger if the type of content is on-demand content than if the type of content is live content.

3. The method of claim 1, wherein the difference is determined based on comparing the timestamp with network time protocol information.

4. The method of claim 1, wherein the timestamp is associated with at least one of:
   a time at which the one or more content fragments were packaged,
   a time at which the one or more content fragments were sent by a content provider, or
   a time at which the one or more content fragments is scheduled to be output via a playback device.

5. The method of claim 1, wherein a difference is based on insufficient bandwidth at a playback device.

6. The method of claim 1, wherein the threshold is less than one hundred milliseconds.

7. The method of claim 1, wherein the threshold is configurable.

8. A device comprising:
   one or more processors; and
   memory storing instructions that, when executed by the one or more processors, cause the device to:
   receive one or more content fragments associated with a type of content;
   determine, based on the type of content, a threshold indicating a difference between a current playback time and a target playback time;

receive a manifest indicating one or more timestamps associated with the one or more content fragments, wherein each timestamp of the one or more timestamps indicates a target playback time of a corresponding content fragment of the one or more content fragments;

based on a determination that a difference, indicated by a timestamp of the one or more timestamps, between a current playback time of a first content fragment, of the one or more content fragments, and a target playback time of the first content fragment has satisfied the threshold:

cause an adjustment to playback to advance to a second content fragment, of the one or more content fragments, corresponding to a target playback time of the second content fragment.

9. The device of claim 8, wherein the threshold is larger if the type of content is on-demand content than if the type of content is live content.

10. The device of claim 8, wherein the difference is determined based on comparing the timestamp with network time protocol information.

11. The device of claim 8, wherein the timestamp is associated with at least one of:
a time at which the one or more content fragments were packaged,
a time at which the one or more content fragments were sent by a content provider, or
a time at which the one or more content fragments is scheduled to be output via a playback device.

12. The device of claim 8, wherein a difference is based on insufficient bandwidth at a playback device.

13. The device of claim 8, wherein the threshold is less than one hundred milliseconds.

14. The device of claim 8, wherein the threshold is configurable.

15. A non-transitory computer-readable medium storing instructions that, when executed, cause:
receiving one or more content fragments associated with a type of content;
determining, based on the type of content, a threshold indicating a difference between a current playback time and a target playback time;
receiving a manifest indicating one or more timestamps associated with the one or more content fragments, wherein each timestamp of the one or more timestamps indicates a target playback time of a corresponding content fragment of the one or more content fragments;
based on a determination that a difference, indicated by a timestamp of the one or more timestamps, between a current playback time of a first content fragment, of the one or more content fragments, and a target playback time of the first content fragment has satisfied the threshold:
causing an adjustment to playback to advance to a second content fragment, of the one or more content fragments, corresponding to a target playback time of the second content fragment.

16. The non-transitory computer-readable medium of claim 15, wherein the threshold is larger if the type of content is on-demand content than if the type of content is live content.

17. The non-transitory computer-readable medium of claim 15, wherein the difference is determined based on comparing the timestamp with network time protocol information.

18. The non-transitory computer-readable medium of claim 15, wherein the timestamp is associated with at least one of:
a time at which the one or more content fragments were packaged,
a time at which the one or more content fragments were sent by a content provider, or
a time at which the one or more content fragments is scheduled to be output via a playback device.

19. The non-transitory computer-readable medium of claim 15, wherein a difference is based on insufficient bandwidth at a playback device.

20. The non-transitory computer-readable medium of claim 15, wherein the threshold is less than one hundred milliseconds.

* * * * *